(12) United States Patent
Xu

(10) Patent No.: US 9,430,980 B2
(45) Date of Patent: Aug. 30, 2016

(54) LIQUID CRYSTAL DISPLAY PANEL AND LIQUID CRYSTAL DISPLAY DEVICE

(71) Applicant: Shenzhen China Star Optoelectronics Technology Co., Ltd., Guangdong (CN)

(72) Inventor: Xiangyang Xu, Guangdong (CN)

(73) Assignee: SHENZHEN CHINA STAR OPTOELECTRONICS TECHNOLOGY CO., Guangdong (CN)

( * ) Notice: Subject to any disclaimer, the term of this patent is extended or adjusted under 35 U.S.C. 154(b) by 42 days.

(21) Appl. No.: 14/376,841

(22) PCT Filed: May 9, 2014

(86) PCT No.: PCT/CN2014/077140
§ 371 (c)(1),
(2) Date: Aug. 5, 2014

(87) PCT Pub. No.: WO2015/168934
PCT Pub. Date: Nov. 12, 2015

(65) Prior Publication Data
US 2015/0332634 A1 Nov. 19, 2015

(30) Foreign Application Priority Data
May 6, 2014 (CN) .......................... 2014 1 0189316

(51) Int. Cl.
*G09G 3/36* (2006.01)
*G09G 3/34* (2006.01)
*G02F 1/1362* (2006.01)
*G02F 1/1368* (2006.01)
*G02F 1/1345* (2006.01)

(52) U.S. Cl.
CPC .......... *G09G 3/3648* (2013.01); *G02F 1/1368* (2013.01); *G02F 1/13454* (2013.01);
(Continued)

(58) Field of Classification Search
CPC ............. G09G 3/3406; G09G 3/3648; G09G 3/3413; G09G 3/3233; G09G 3/2003; G09G 3/3611; G09G 3/22; G09G 3/36; G09G 3/3208; G09G 2300/0842; G09G 2300/0809; G09G 2310/0235; G09G 2320/0646; G09G 2320/0626; G09G 2320/066; G09G 2320/0666; G09G 2320/0653; G09G 2320/02; G09G 2320/0673; G09G 2320/0276; G09G 2320/0285; G09G 2320/0606; G09G 2320/062; G09G 2320/103; G09G 2320/043; G09G 2320/0233; G09G 2320/0242; G09G 2340/0435; G09G 2340/0428; G09G 2330/021; G09G 2330/022; G09G 2360/0271; G09G 2360/144; G09G 2360/16; G09G 2360/145
See application file for complete search history.

(56) References Cited

U.S. PATENT DOCUMENTS 6,870,323 B1 * 3/2005 Cok .................... G09G 3/3216
315/169.1
2005/0073262 A1 4/2005 Cok
(Continued)

FOREIGN PATENT DOCUMENTS

CN 1864188 A 11/2006
CN 101447145 A 6/2009
CN 102194429 A 9/2011

OTHER PUBLICATIONS

English abstract of CN102194429.
(Continued)

*Primary Examiner* — Nalini Mummalaneni
(74) *Attorney, Agent, or Firm* — WPAT, P.C., Intellectual Property Attorneys; Anthony King

(57) ABSTRACT

The present invention provides an liquid crystal display panel and an liquid crystal display device. The liquid crystal display panel comprises a second substrate. The second substrate comprises a plurality of pixel units. The pixel unit comprises a brightness adjustment pixel which is employed for changing the display brightness of itself to adjust the brightness of the liquid crystal display panel. The contrast ratio and the brightness of the liquid crystal display panel can be raised at outdoor or in a strong ambient light environment and the power consumption can be decreased.

9 Claims, 2 Drawing Sheets

(52) U.S. Cl.
CPC ........... *G02F1/136286* (2013.01); *G09G 3/34* (2013.01); *G09G 3/3413* (2013.01); *G09G 3/3607* (2013.01); *G09G 2300/0404* (2013.01); *G09G 2300/0426* (2013.01); *G09G 2300/0478* (2013.01); *G09G 2330/021* (2013.01)

(56) References Cited

U.S. PATENT DOCUMENTS

| | | |
|---|---|---|
| 2006/0291188 A1 | 12/2006 | Nakayama et al. |
| 2009/0135167 A1 | 5/2009 | Sakai et al. |
| 2011/0148832 A1* | 6/2011 | Nie .................... G09G 3/3648 345/207 |
| 2011/0221792 A1* | 9/2011 | Maeda ................ G09G 3/3607 345/690 |

OTHER PUBLICATIONS

English abstract of CN1864188.
English abstract of CN101447145.

* cited by examiner

LIQUID CRYSTAL DISPLAY PANEL AND LIQUID CRYSTAL DISPLAY DEVICE

BACKGROUND OF THE INVENTION

1. Field of the Invention

The present invention generally relates to a liquid display skill, and more particularly to a liquid crystal display panel with brightness compensation.

2. Description of Prior Art

TFT-LCD (Thin Film Transistor Liquid Crystal Display) is one of Active Matrix Liquid Crystal Display (AM-LCD). TFT-LCD employed as being a fine quality flat panel display possesses benefits of small body, low power consumption, high resolution, high color saturation, fast image refreshing and etc.

TFT-LCD panel is generally considered with two glass substrates with a liquid crystal layer therebetween. A color filter film is positioned on the upper glass substrate. Thin film transistors (TFTs) are arranged on the lower glass substrate. An electronic field variation is generated with the signals on the TFTs to control the tilted direction of the liquid crystal molecules and to change the transmission rate of the polarized light for achieving display. Besides, the upper glass substrate with the attached color filter film forms a plurality of pixel units comprising three colors, Red, Green and Blue. These pixel units with colors, Red, Green and Blue constructs the image pictures of the liquid crystal display panel.

Liquid crystal itself cannot generate light but only can adjust the light of the back light source to realize showing images. The liquid crystal display panel 100 is located relatively to the back light module. The back light module can be a side lighting type back light module or a bottom lighting type back light module to provide back light for the liquid crystal display panel. However, the brightness and the contrast ratio of such liquid crystal display panel are tremendously descended at outdoor or in a strong ambient light environment. Only the back light brightness has to be raised for promoting the brightness and the contrast ratio. The higher the back light brightness is, the power consumption comes to be higher.

SUMMARY OF THE INVENTION

An objective of the present invention is to provide an liquid crystal display panel for solving issues that the back light brightness of the back light module needs to be raised at outdoor and in a strong ambient light environment and power consumption becomes larger.

For solving the aforesaid issues, the present invention provides an liquid crystal display panel comprising a first substrate, a second substrate and a liquid crystal layer positioned between the first substrate and the second substrate, and the second substrate comprises data lines, scan lines, and a plurality of pixel units crisscross formed by the data lines and the scan lines;

wherein the pixel unit comprises: a display pixel, employed for displaying image signals, and the display pixel comprises a red subpixel, a green subpixel and a blue subpixel; and a brightness adjustment pixel, employed for changing the display brightness of itself to adjust the brightness of the liquid crystal display panel, and the brightness adjustment pixel is a white pixel;

the liquid crystal display panel further comprises:
an adjustment module, employed for adjusting the display brightness of the brightness adjustment pixel according to brightness of an ambient light.

In the liquid crystal display panel of the present invention, the adjustment module is externally connected to the liquid crystal display panel. The brightness adjustment pixel further comprises a thin film transistor, and the adjustment module comprises an amplitude control unit and a switch control unit;

an output end of the thin film transistor is coupled to a pixel electrode of the brightness adjustment pixel;

the switch control unit is coupled to a control end of the thin film transistor of the brightness adjustment pixel via an external line to control on and off of the thin film transistor of the brightness adjustment pixel;

the amplitude control unit is coupled to an input end of the thin film transistor of the brightness adjustment pixel via another external line to input brightness adjustment signal to the brightness adjustment pixel and the brightness adjustment signal is generated according to the brightness of the ambient light.

In the liquid crystal display panel of the present invention, the brightness adjustment pixel further comprises a thin film transistor, and the adjustment module comprises an amplitude control unit and a switch control unit;

an output end of the thin film transistor is coupled to a pixel electrode of the brightness adjustment pixel;

the switch control unit is coupled to a control end of the thin film transistor of the brightness adjustment pixel via an external line to control on and off of the thin film transistor of the brightness adjustment pixel;

the liquid crystal display panel further comprises:
a source driving chip, employed for transmitting data signals to the data lines;

the amplitude control unit is located in the source driving chip and coupled to the input end of the thin film transistor of the brightness adjustment pixel via the data line to input brightness adjustment signal to the brightness adjustment pixel and the brightness adjustment signal is generated according to the brightness of the ambient light.

In the liquid crystal display panel of the present invention, the brightness adjustment signal of the brightness adjustment pixel is generated according to the brightness of the image signals of the corresponding display pixel and the brightness of the ambient light.

In the liquid crystal display panel of the present invention, the brightness adjustment signal of the brightness adjustment pixel is a mean value of the image signals of all the subpixels of the corresponding display pixel multiplying by a gain coefficient and the gain coefficient is proportional to the brightness of the ambient light.

The present invention provides an liquid crystal display panel, comprising a first substrate, a second substrate and a liquid crystal layer positioned between the first substrate and the second substrate, the second substrate comprises data lines, scan lines, and a plurality of pixel units crisscross formed by the data lines and the scan lines;

wherein the pixel unit comprises:
a display pixel, employed for displaying image signals; and
a brightness adjustment pixel, employed for changing the display brightness of itself to adjust the brightness of the liquid crystal display panel.

In the liquid crystal display panel of the present invention, the liquid crystal display panel further comprises:

an adjustment module, employed for adjusting the display brightness of the brightness adjustment pixel according to brightness of an ambient light.

In the liquid crystal display panel of the present invention, the adjustment module is externally connected to the liquid crystal display panel, and the brightness adjustment pixel further comprises a thin film transistor, and the adjustment module comprises an amplitude control unit and a switch control unit;

an output end of the thin film transistor is coupled to a pixel electrode of the brightness adjustment pixel;

the switch control unit is coupled to a control end of the thin film transistor of the brightness adjustment pixel via an external line to control on and off of the thin film transistor of the brightness adjustment pixel;

the amplitude control unit is coupled to an input end of the thin film transistor of the brightness adjustment pixel via another external line to input brightness adjustment signal to the brightness adjustment pixel and the brightness adjustment signal is generated according to the brightness of the ambient light.

In the liquid crystal display panel of the present invention, the brightness adjustment pixel further comprises a thin film transistor, and the adjustment module comprises an amplitude control unit and a switch control unit;

an output end of the thin film transistor is coupled to a pixel electrode of the brightness adjustment pixel;

the switch control unit is coupled to a control end of the thin film transistor of the brightness adjustment pixel via an external line to control on and off of the thin film transistor of the brightness adjustment pixel;

the liquid crystal display panel further comprises:

a source driving chip, employed for transmitting data signals to the data lines;

the amplitude control unit is located in the source driving chip and coupled to the input end of the thin film transistor of the brightness adjustment pixel via the data line to input brightness adjustment signal to the brightness adjustment pixel and the brightness adjustment signal is generated according to the brightness of the ambient light.

In the liquid crystal display panel of the present invention, the brightness adjustment signal of the brightness adjustment pixel is generated according to the brightness of the image signals of the corresponding display pixel and the brightness of the ambient light.

In the liquid crystal display panel of the present invention, the brightness adjustment signal of the brightness adjustment pixel is a mean value of the image signals of all the subpixels of the corresponding display pixel multiplying by a gain coefficient and the gain coefficient is proportional to the brightness of the ambient light.

In the liquid crystal display panel of the present invention, the control ends of the thin film transistors of all the brightness adjustment pixels share a driving signal, and the driving signal is a direct current low level voltage.

In the liquid crystal display panel of the present invention, the display pixel comprises a red subpixel, a green subpixel and a blue subpixel, and the brightness adjustment pixel is a white pixel.

The present invention also provides an liquid crystal display device, comprising:

a back light module; and a liquid crystal display panel, comprising a first substrate, a second substrate and a liquid crystal layer positioned between the first substrate and the second substrate;

the second substrate comprises data lines, scan lines, and a plurality of pixel units crisscross formed by the data lines and the scan lines;

wherein the pixel unit comprises:

a display pixel, employed for displaying image signals; and a brightness adjustment pixel, employed for changing the display brightness of itself to adjust the brightness of the liquid crystal display panel.

By adding a brightness adjustment pixel which can change the display brightness of itself according to the present invention, the brightness of the brightness adjustment pixel is adjustable according to the brightness of the ambient light. Even at outdoor or in a strong ambient light environment, the brightness of the back light module does not need to be increased but the contrast ratio and the brightness of the liquid crystal display panel can be raised and the power consumption can be decreased.

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

Figure 1:
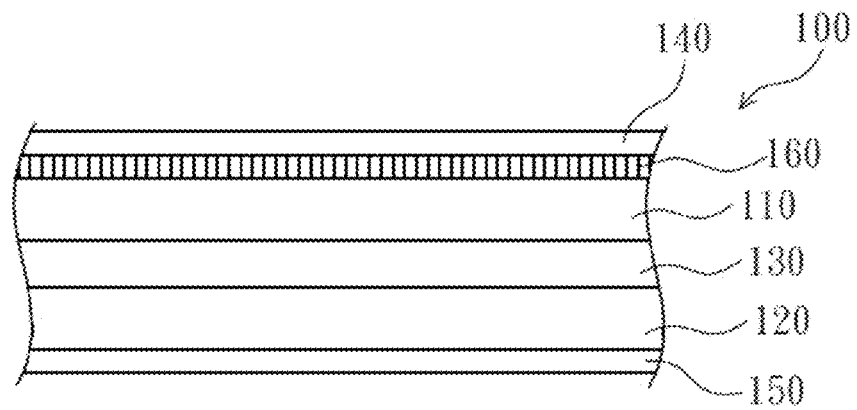
FIG. 1 depicts a structural diagram of an liquid crystal display panel according to prior arts.

Please refer to FIG. 1, which a structural diagram of an liquid crystal display panel according to prior arts. A liquid crystal display device can comprise an liquid crystal display panel 100 and a back light module (not shown). The liquid crystal display panel 100 is located relatively to the back light module. The back light module can be a side lighting type back light module or a bottom lighting type back light module to provide back light for the liquid crystal display panel 100. The brightness of the backlight module is adjustable. The liquid crystal display panel 100 comprises a plurality of pixels (such as Red, Green and Blue). The brightnesses of these display pixels are raised in accordance with the increase of the grey scale value. The grey scale value can be 0~N. N can be such as 255. When the grey scale value is 255, the brightness of the liquid crystal display panel 100 becomes at highest.

As shown in FIG. 1, the liquid crystal display panel 100 comprises a first substrate 110, a second substrate 120, an liquid crystal layer 130, a first polarizer film 140, a second polarizer film 150 and a retardation film 160. The liquid crystal layer 130 is formed at the interior sides of the first substrate 110 and the second substrate 120. The first polarizer film 140 is positioned at the exterior side of the first substrate 110. The second polarizer film 150 is positioned at the exterior side of the second substrate 120. The retardation film 160 can be laminated at the surface of the exterior side of the first substrate 110 or the second substrate 120.

As shown in FIG. 1, the substrate material of the first substrate 110 and the second substrate 120 can be a glass substrate or a flexible plastic substrate. For instance, the first substrate 110 can be a color filter (CF) glass substrate or a substrate made of other material. The second substrate 120 can be a thin film transistor (TFT) matrix glass substrate or a substrate made of other material. Significantly, in some embodiments, the CF and TFT matrix can be arranged at the same substrate.

The second substrate 120 also comprises data lines, scan lines, and a plurality of pixel units crisscross formed by the data lines and the scan lines. The pixel unit comprises: display pixel comprising a plurality of subpixel (such as R, G and B), employed for displaying image signals. All the subpixels of each display pixel comprises a thin film transistor.

The second substrate 120 further comprises a gate driving chip, coupled to a control end of the thin film transistor of the display pixel via the scan line. The gate driving chip inputs scan signals to the display pixel via the scan line and control on and off of the thin film transistor; the second substrate 120 further comprises a source driving chip, coupled to an input end of the thin film transistor of the display pixel via the data line. When the thin film transistor is conducted, the source driving chip inputs data signals to the display pixel via the data line to generate images.

The second substrate 120 comprises pixel electrodes. The pixel electrode generates a pixel voltage at the output end of the thin film transistor with the data signals at the input end of the thin film transistor. That is, the pixel electrodes of all subpixels R, G, B of the display pixel respectively generate a pixel voltage. A voltage difference is generated between the pixel voltage and the common voltage Vcom of the first electrode of the first substrate 110 which is in accordance with all the subpixels to form an electric field. The electric field drives the liquid crystal molecules in the liquid crystal layer 130 to be tilted and to allow the light passing through the liquid crystal layer 130 or not. Then, different brightness of liquid crystal display panel 100 can be achieved.

Figure 2:
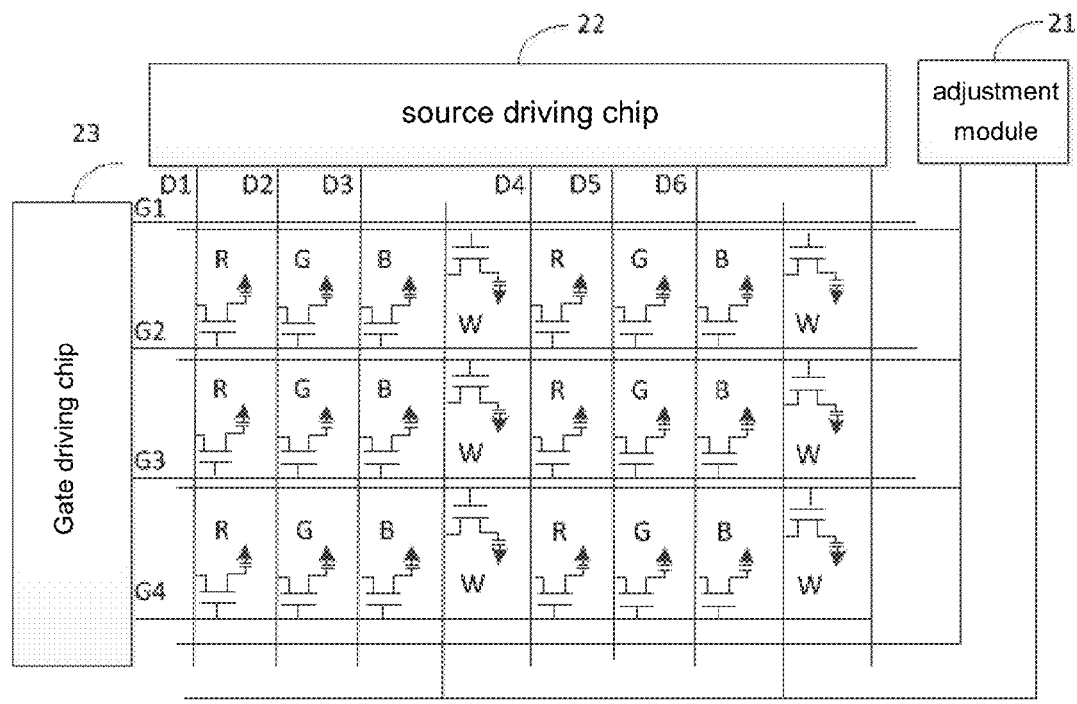
FIG. 2 depicts a structural diagram of an liquid crystal display panel according to a first embodiment of the present invention.
Figure 2:
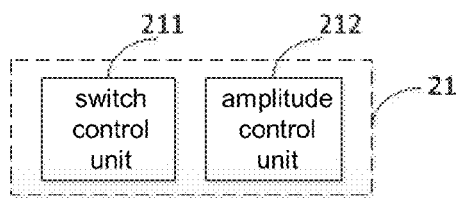

Please refer to FIG. 2. FIG. 2 depicts a structural diagram of an liquid crystal display panel according to a first embodiment of the present invention.

As shown in FIG. 2, the second substrate 120 comprises a plurality of pixel units. The pixel unit comprises a display pixel (RGB). The pixel unit also comprises a brightness adjustment pixel (white pixel W). The brightness adjustment pixel is capable of changing the display brightness of itself to adjust the brightness of the liquid crystal display panel. Each of the brightness adjustment pixels comprises a thin film transistor.

In this embodiment, as the scan signal inputted by the gate driving chip 23 via scan lines ($G_1$-$G_4$) is at high level voltage, the data signals inputted to all subpixels (such as RGB) of the display pixel by the source driving chip 22 via data lines ($D_1$-$D_6$) are image signals for generating color images.

The liquid crystal display panel 100 also comprises an adjustment module 21. The adjustment module 21 is externally connected to the liquid crystal display panel 100 to adjust the display brightness of the brightness adjustment pixel according to brightness of an ambient light. The display brightness of the brightness adjustment pixel itself is changed according to the brightness adjustment signal. The brightness adjustment signal is generated according to the brightness of the ambient light.

The adjustment module 21 comprises a switch control unit 211 and an amplitude control unit 212. An output end of the thin film transistor of the brightness adjustment pixel is coupled to a pixel electrode of the brightness adjustment pixel; the pixel electrode generates a pixel voltage at the output end of the thin film transistor with the brightness adjustment signal at the input end of the thin film transistor.

The switch control unit 211 is coupled to a control end of the thin film transistor of the brightness adjustment pixel via an external line to control on and off of the thin film transistor of the brightness adjustment pixel with a driving signal inputted by the external line. Preferably, the control ends of the thin film transistors of all the brightness adjustment pixels share a driving signal. The driving signal is a direct current low level voltage. The high level and low level of the voltage is relatively decided by referring the common voltage Vcom at the first electrode of the first substrate.

The amplitude control unit 212 is coupled to an input end of the thin film transistor of the brightness adjustment pixel via another external line. When the thin film transistor is on, the amplitude control unit 212 inputs brightness adjustment signal to the brightness adjustment pixel. The brightness adjustment signal is generated according to the brightness of the ambient light. For instance, the voltage of the brightness adjustment signal can be generated by a mean value (or mean square deviation) of the image signal voltages of all the subpixels of the display pixel multiplying by a gain coefficient and the gain coefficient is proportional to the brightness of the ambient light. The gain coefficient is proportional to the brightness of the ambient light. When the ambient light is stronger, the gain coefficient becomes larger and the voltage of the brightness adjustment signal inputted in the brightness adjustment pixel also becomes larger. When the ambient light gets weaker, the gain coefficient becomes smaller and the voltage of the brightness adjustment signal inputted in the brightness adjustment pixel also becomes lower. As an illustration, the brightness adjustment signal can be a square signal. The period of the square signal is the period of the image frames. The voltage of the square signal can be manually adjusted according to the user's feeling about the brightness of the ambient light or automatically adjusted by the amplitude control unit 212 according to the intensity of the ambient light. Eventually, the square signal after adjustment is inputted. The high level and low level of the square signal is relatively decided by referring the common voltage Vcom.

When the amplitude control unit 212 automatically adjusts the brightness adjustment signal according to the intensity of the ambient light, the amplitude control unit 212 also comprises an ambient light detector wherein the voltage amplitude of the brightness adjustment signal will be automatically adjusted according to the intensity of the ambient light detected by the ambient light detector. When the ambient light detector senses a strong ambient light, the amplitude control unit 212 increases the voltage value of the brightness adjustment signal to raise the pixel voltage at the output end of the thin film transistor of the brightness adjustment pixel to make the brightness of the liquid crystal display panel become higher; when the ambient light gets dimmed, the amplitude control unit 212 decreases the voltage value of the brightness adjustment signal to descend the pixel voltage at the output end of the thin film transistor of the brightness adjustment pixel to make the brightness of the liquid crystal display panel become lower.

By the aforesaid adjustment of the voltage of the brightness adjustment signal inputted to the brightness adjustment pixel and changing the voltage difference between the pixel voltage of the brightness adjustment pixel and the common voltage at the first electrode of the first substrate, the transmission rate of light is changed to adjust the brightness of the liquid crystal display device.

As an illustration, a voltage difference between the brightness adjustment signal and the common voltage at the first electrode of the first substrate is formed by changing the pixel voltage of the white pixel. The pixel voltage of the white pixel is generated at the output end of the thin film transistor of the white pixel according to the brightness adjustment signal inputted at the input end of the thin film transistor of the white pixel. The voltage difference drives the white pixel to appear with different grey scales to change the display brightness of the white pixel itself. Normally, the common voltage at the first electrode of the first substrate is maintained the same and merely the pixel voltage of the white pixel is changed to vary the voltage difference. When the brightness adjustment signal inputted to the white pixel becomes larger, the voltage difference becomes larger and the transmission rate of the white light gets higher. Then, the brightness of the liquid crystal display panel becomes higher. When the brightness adjustment signal inputted to the white pixel becomes smaller, the voltage difference becomes smaller and the transmission rate of the white light gets lower. Then the brightness of the liquid crystal display panel becomes lower.

By adding the brightness adjustment pixel (white pixel) according to the present invention and self adapting adjustment for the voltage of the brightness adjustment signal inputted to the white pixel according to the intensity of the ambient light, the transmission rate of the white light is adjusted accordingly. Therefore, increasing the back light brightness of the back light source will not be required but the brightness of liquid crystal display panel can be raised even at outdoor or in a strong ambient light environment.

Figure 3:
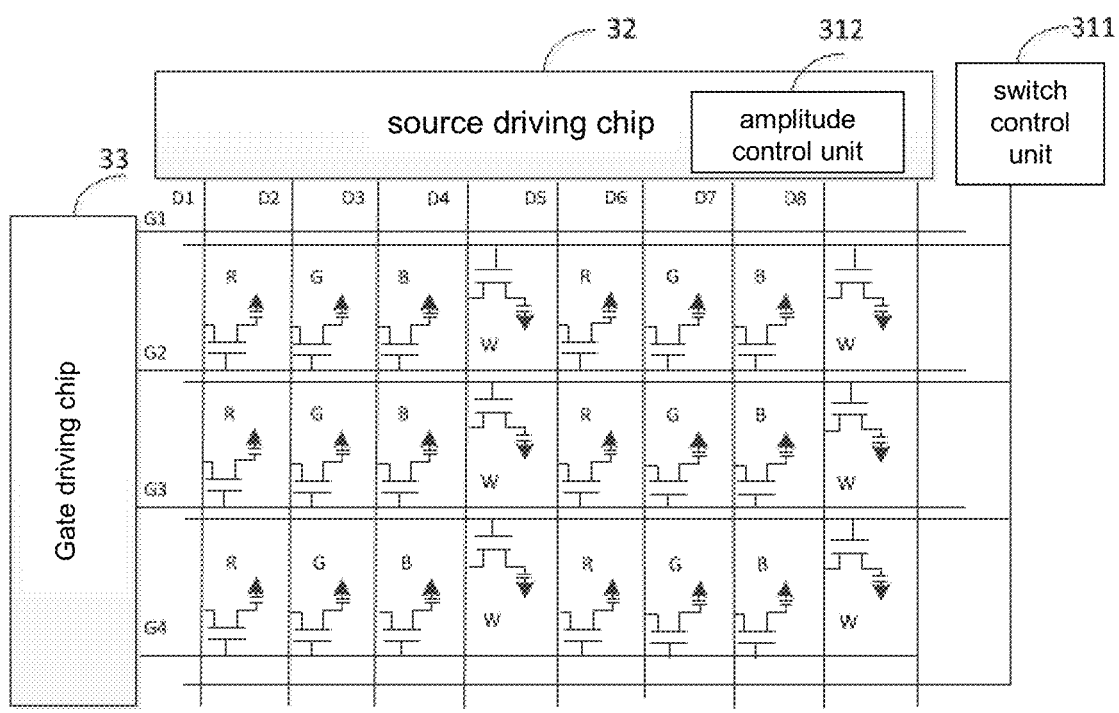
FIG. 3 depicts a structural diagram of an liquid crystal display panel according to a second embodiment of the present invention.

Please refer to FIG. 3. FIG. 3 depicts a structural diagram of an liquid crystal display panel according to a second embodiment of the present invention.

As shown in FIG. 3, the second substrate 120 comprises a plurality of pixel units. The pixel unit comprises a display pixel (RGB). The pixel unit also comprises a brightness adjustment pixel (white pixel W). The brightness adjustment pixel is capable of changing the display brightness of itself to adjust the brightness of the liquid crystal display panel. The brightness adjustment pixel comprises a thin film transistor. In this embodiment, as the scan signal inputted by the gate driving chip 33 is at high level voltage, the data signals inputted to all subpixels (such as RGB) of the display pixel by the source driving chip 32 are image signals and brightness adjustment signal; that is, the source driving chip 32 transmits the image signals to all subpixels (such as RGB) of the display pixel via data lines for generating color images; the source driving chip 32 transmits the brightness adjustment signal to the brightness adjustment pixel.

The liquid crystal display panel 100 also comprises an adjustment module (not shown). The adjustment module is capable of adjusting the display brightness of the brightness adjustment pixel according to brightness of an ambient light. According to the brightness adjustment signal, the display brightness of the brightness adjustment pixel itself is changed. The brightness adjustment signal is generated according to the brightness of the ambient light. The adjustment module comprises a switch control unit 311 and an amplitude control unit 312.

An output end of the thin film transistor of the brightness adjustment pixel is coupled to a pixel electrode of the brightness adjustment pixel; the pixel electrode generates a pixel voltage at the output end of the thin film transistor with the brightness adjustment signal at the input end of the thin film transistor.

The switch control unit 311 is coupled to a control end of the thin film transistor of the brightness adjustment pixel via an external line to control on and off of the thin film transistor of the brightness adjustment pixel with a driving signal inputted by the external line. Preferably, the control ends of the thin film transistors of all the brightness adjustment pixels share a driving signal. The driving signal is a direct current low level voltage. The high level and low level of the voltage is relatively decided by referring the common voltage Vcom at the first electrode of the first substrate. The amplitude control unit 312 is located in the in the data driving chip 32 and coupled to the input end of the thin film transistor of the brightness adjustment pixel via the data line (such as $D_4$ or $D_8$). When the thin film transistor is on, the amplitude control unit 312 inputs brightness adjustment signal to the brightness adjustment pixel. The brightness adjustment signal is generated according to the image signals of the corresponding display pixel and the brightness of the ambient light. For instance, the voltage of the brightness adjustment signal can be generated by a mean value (or mean square deviation) of the image signal voltages of all the subpixels of the display pixel multiplying by a gain coefficient and the gain coefficient is proportional to the brightness of the ambient light. The gain coefficient is proportional to the brightness of the ambient light. When the ambient light is stronger, the gain coefficient becomes larger and the voltage of the brightness adjustment signal inputted in the brightness adjustment pixel also becomes larger. When the ambient light gets weaker, the gain coefficient becomes smaller and the voltage of the brightness adjustment signal inputted in the brightness adjustment pixel also becomes lower. As an illustration, the brightness adjustment signal can be a square signal. The period of the square signal is the period of the image frames. The voltage of the square signal can be automatically adjusted by the amplitude control unit 312 according to the intensity of the ambient light. Eventually, the square signal after adjustment is inputted. The high level and low level of the square signal is relatively decided by referring the common voltage Vcom.

By the aforesaid adjustment of the voltage of the brightness adjustment signal inputted to the brightness adjustment pixel and changing the voltage difference between the pixel voltage of the brightness adjustment pixel and the common voltage at the first electrode of the first substrate, the transmission rate of light is changed to adjust the brightness of the liquid crystal display device.

As an illustration, a voltage difference between the brightness adjustment signal and the common voltage at the first electrode of the first substrate is formed by changing the pixel voltage of the white pixel. The pixel voltage of the white pixel is generated at the output end of the thin film transistor of the white pixel according to the brightness adjustment signal inputted at the input end of the thin film transistor of the white pixel. The voltage difference drives the white pixel to appear with different grey scales to change the display brightness of the white pixel itself. Normally, the common voltage at the first electrode of the first substrate is maintained the same and merely the pixel voltage of the white pixel is changed to vary the voltage difference. When the brightness adjustment signal inputted to the white pixel becomes larger, the voltage difference becomes larger and the transmission rate of the white light gets higher. Then, the brightness of the liquid crystal display panel becomes higher. When the brightness adjustment signal inputted to the white pixel becomes smaller, the voltage difference becomes smaller and the transmission rate of the white light gets lower. Then the brightness of the liquid crystal display panel becomes lower.

By adding the brightness adjustment pixel (white pixel) according to the present invention and self adapting adjustment for the voltage of the brightness adjustment signal inputted to the white pixel according to the intensity of the ambient light, the transmission rate of the white light is adjusted accordingly. Therefore, increasing the back light brightness of the back light source will not be required but the brightness of liquid crystal display panel can be raised even at outdoor or in a strong ambient light environment. Comparing with the first embodiment of the present invention, an obvious effect of reducing the manufacture cost can be achieved in this embodiment due to that the adjustment module is located in the liquid crystal control panel and its higher integration.

The present invention also provides a liquid crystal display device, comprising a back light module and a liquid crystal display panel. liquid crystal display panel comprises a first substrate, a second substrate and a liquid crystal layer positioned between the first substrate and the second substrate; the second substrate comprises data lines, scan lines, and a plurality of pixel units crisscross formed by the data lines and the scan lines;

The pixel unit comprises: a display pixel, employed for displaying image signals; and a brightness adjustment pixel, employed for changing the display brightness of itself to adjust the brightness of the liquid crystal display panel. With the detail description related with the liquid crystal display panel as aforementioned, the repeated detail explanation is omitted here.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A liquid crystal display panel, comprising a first substrate, a second substrate and a liquid crystal layer positioned between the first substrate and the second substrate, and the second substrate comprises data lines, scan lines, and a plurality of pixel units crisscross formed by the data lines, and the scan lines;
   wherein the pixel unit comprises:
   a display pixel, employed for displaying image signals, and the display pixel comprises a red subpixel, a green subpixel, a blue subpixel, and a white subpixel, wherein one of the scan lines is used for inputting a scan signal into the red subpixel, the green subpixel and the blue subpixel of the display pixel; and
   the white subpixel is a brightness adjustment pixel, employed for changing the display brightness of itself to adjust the brightness of the liquid crystal display panel;
   wherein the liquid crystal display panel further comprises:
   an adjustment module, employed for adjusting the display brightness of the brightness adjustment pixel according to brightness of an ambient light; and
   wherein the brightness adjustment pixel further comprises a thin film transistor, and the adjustment module comprises an amplitude control unit and a switch control unit;
   an output end of the thin film transistor is coupled to a pixel electrode of the brightness adjustment pixel; and
   the switch control unit is coupled to a control end of the thin film transistor of the brightness adjustment pixel via an external line to control on and off of the thin film transistor of the brightness adjustment pixel;
   the amplitude control unit is coupled to an input end of the thin film transistor of the brightness adjustment pixel via an external data line to input brightness adjustment signal to the brightness adjustment pixel and the magnitude of the brightness adjustment signal is a mean value of the image signals of the red, green, and blue subpixels of the corresponding display pixel multiplying by a gain coefficient and the gain coefficient is proportional to the brightness of the ambient light;
   wherein the external line and the external data line are supplied only to the brightness adjustment pixel of the display pixel, and all the brightness adjustment pixels of the liquid crystal display panel are controlled by a common control signal from the switch control unit.

2. The liquid crystal display panel according to claim 1, wherein the liquid crystal display panel further comprises:
   a source driving chip, employed for transmitting data signals to the data lines;
   the amplitude control unit is located in the source driving chip and coupled to the input end of the thin film transistor of the brightness adjustment pixel via the external data line to input brightness adjustment signal to the brightness adjustment pixel and the brightness adjustment signal is generated according to the brightness of the ambient light.

3. A liquid crystal display panel, comprising a first substrate, a second substrate and a liquid crystal layer positioned between the first substrate and the second substrate, and the second substrate comprises data lines, scan lines, and a plurality of pixel units crisscross formed by the data lines and the scan lines;
   wherein the pixel unit comprises:
   a display pixel, employed for displaying image signals, wherein one of the scan lines is used for inputting a scan signal into the display pixel wherein the display pixel comprises a red subpixel, a green subpixel, a blue subpixel, and a white subpixel; and
   a brightness adjustment pixel, employed for changing the display brightness of itself to adjust the brightness of the liquid crystal display panel, the brightness adjustment pixel is the white subpixel;
   wherein the liquid crystal display panel further comprises:
   an adjustment module, employed for adjusting the display brightness of the brightness adjustment pixel according to brightness of an ambient light; and
   wherein the brightness adjustment pixel further comprises a thin film transistor, and the adjustment module comprises an amplitude control unit and a switch control unit;
   an output end of the thin film transistor is coupled to a pixel electrode of the brightness adjustment pixel;
   the switch control unit is coupled to a control end of the thin film transistor of the brightness adjustment pixel via an external line to control on and off of the thin film transistor of the brightness adjustment pixel;
   the amplitude control unit is coupled to an input end of the thin film transistor of the brightness adjustment pixel via an external data line to input brightness adjustment signal to the brightness adjustment pixel and the magnitude of the brightness adjustment signal is a mean value of the image signals of the red, green, and blue subpixels of the corresponding display pixel multiplying by a gain coefficient and the gain coefficient is proportional to the brightness of the ambient light;

wherein the external line and the external data line are supplied only to the brightness adjustment pixel of the display pixel, and all the brightness adjustment pixels of the liquid crystal display panel are controlled by a common control signal from the switch control unit.

4. The liquid crystal display panel according to claim 3, wherein the driving signal is a direct current low level voltage.

5. The liquid crystal display panel according to claim 3, wherein the liquid crystal display panel further comprises:
a source driving chip, employed for transmitting data signals to the data lines;
the amplitude control unit is located in the source driving chip and coupled to the input end of the thin film transistor of the brightness adjustment pixel via the external data line to input brightness adjustment signal to the brightness adjustment pixel and the brightness adjustment signal is generated according to the brightness of the ambient light.

6. The liquid crystal display panel according to claim 5, wherein the driving signal is a direct current low level voltage.

7. A liquid crystal display device, wherein the device comprises:
a back light module; and
a liquid crystal display panel, comprising a first substrate, a second substrate and a liquid crystal layer positioned between the first substrate and the second substrate;
the second substrate comprises data lines, scan lines, and a plurality of pixel units crisscross formed by the data lines and the scan lines;
wherein the pixel unit comprises:
a display pixel, employed for displaying image signals, wherein one of the scan lines is used for inputting a scan signal into the display pixel wherein the display pixel comprises a brightness adjustment pixel; and
the brightness adjustment pixel, employed for changing the display brightness of itself to adjust the brightness of the liquid crystal display panel;
wherein the liquid crystal display panel further comprises:
an adjustment module, employed for adjusting the display brightness of the brightness adjustment pixel according to brightness of an ambient light; and wherein the brightness adjustment pixel further comprises a thin film transistor, and the adjustment module comprises an amplitude control unit and a switch control unit;
an output end of the thin film transistor is coupled to a pixel electrode of the brightness adjustment pixel;
the switch control unit is coupled to a control end of the thin film transistor of the brightness adjustment pixel via an external line to control on and off of the thin film transistor of the brightness adjustment pixel;
the amplitude control unit is coupled to an input end of the thin film transistor of the brightness adjustment pixel via an external data line to input brightness adjustment signal to the brightness adjustment pixel and the magnitude of the brightness adjustment signal is a mean value of the image signals of red, green, and blue subpixels of the corresponding display pixel multiplying by a gain coefficient and the gain coefficient is proportional to the brightness of the ambient light;
wherein the external line and the external data line are supplied only to the brightness adjustment pixel of the display pixel, and all the brightness adjustment pixels of the liquid crystal display panel are controlled by a common control signal from the switch control unit.

8. The liquid crystal display device according to claim 7, wherein the adjustment module is externally connected to the liquid crystal display panel, and the amplitude control unit is coupled to an input end of the thin film transistor of the brightness adjustment pixel via the external data line to input brightness adjustment signal to the brightness adjustment pixel and the brightness adjustment signal is generated according to the brightness of the ambient light.

9. The liquid crystal display device according to claim 7, wherein the liquid crystal display panel further comprises:
a source driving chip, employed for transmitting data signals to the data lines;
the amplitude control unit is located in the source driving chip and coupled to the input end of the thin film transistor of the brightness adjustment pixel via the external data line to input brightness adjustment signal to the brightness adjustment pixel and the brightness adjustment signal is generated according to the brightness of the ambient light.

* * * * *